Figure 1:
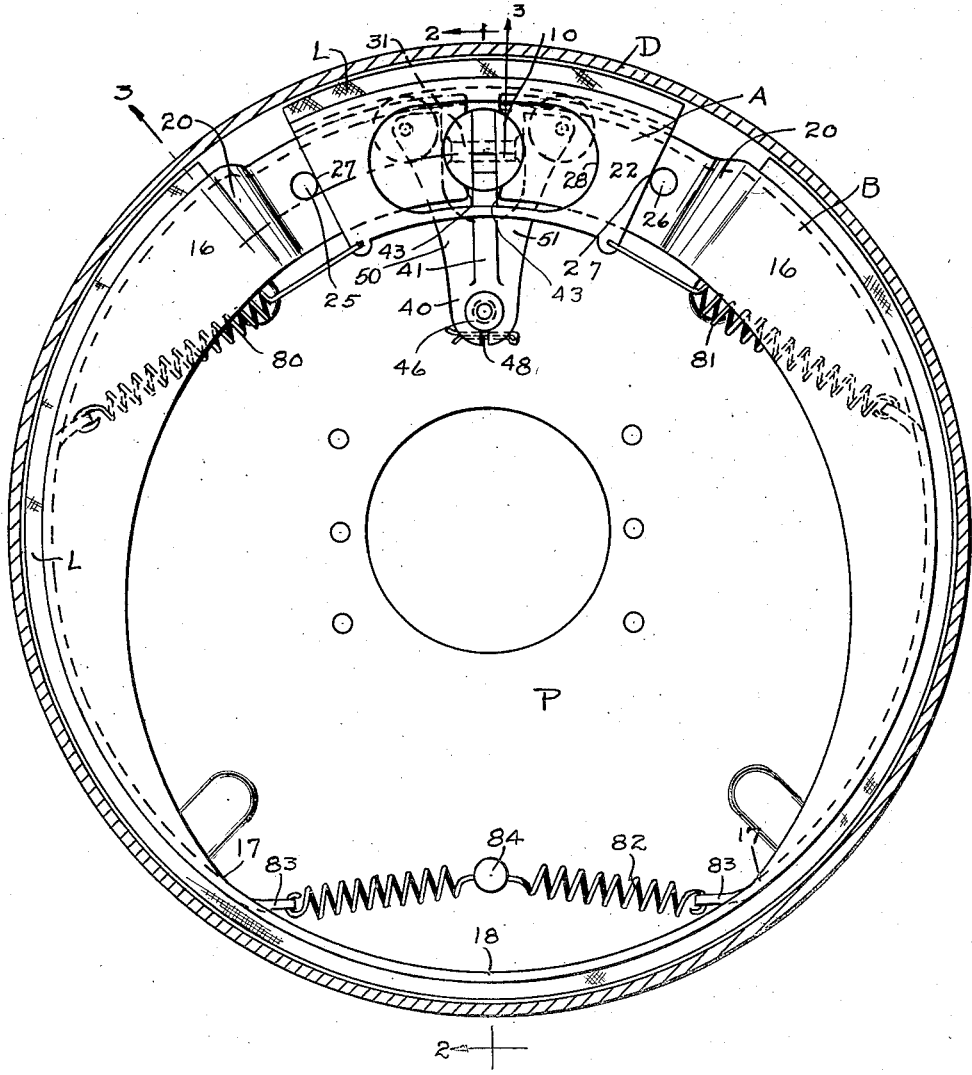

May 17, 1932.                J. SNEED                1,858,311
                           BRAKING DEVICE
                  Filed Sept. 30, 1927      2 Sheets-Sheet 1

May 17, 1932.  J. SNEED  1,858,311
BRAKING DEVICE
Filed Sept. 30, 1927   2 Sheets-Sheet 2
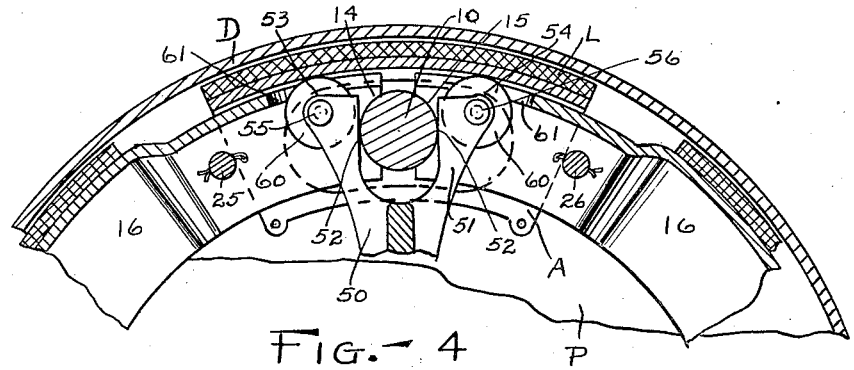
FIG.-4
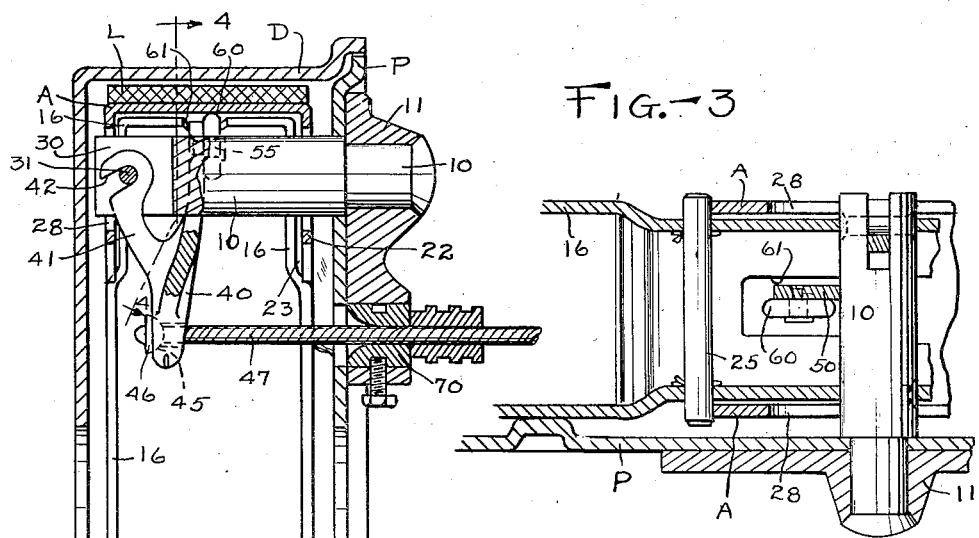
FIG.-3
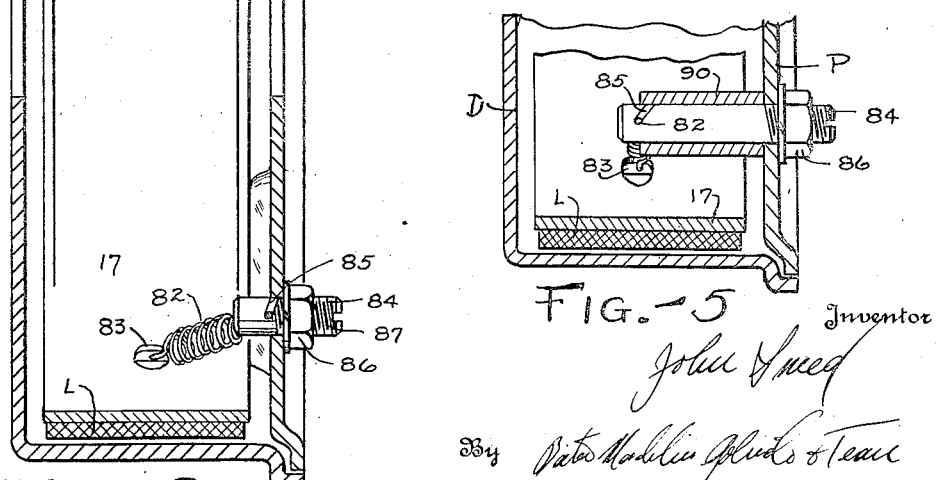
FIG.-2
FIG.-5
Inventor
John Sneed Patented May 17, 1932

1,858,311

UNITED STATES PATENT OFFICE

JOHN SNEED, OF DETROIT, MICHIGAN, ASSIGNOR TO THE MIDLAND STEEL PRODUCTS COMPANY, OF CLEVELAND, OHIO, A CORPORATION OF OHIO

BRAKING DEVICE

Application filed September 30, 1927. Serial No. 223,020.

This invention relates to brakes, and more particularly to brakes adapted for use on motor vehicles.

It is among the objects of my invention to construct a brake having "self-energizing characteristics" wherein these characteristics are so controlled or modified that the brake does not grab or freeze. Another object is to provide a brake of the auxiliary servo shoe type, wherein the pedal effort is directed to forcing the servo shoe into engagement with the drum, and wherein the servo shoe in turn acts upon the main shoe. Other objects include, providing a maximum arc of engagement between the shoe or shoes and the drum; mounting the shoe or shoes to eliminate the comparatively idle friction surfaces at what is known as the "heel" of the shoe; forming and shaping the main and servo shoes so that they occupy a minimum space consistent with freedom of operation; and eliminating friction and wear in the moving parts of the brake operating mechanism. Other objects include improving the mechanism for causing brake engagement. Another object is to construct the main brake shoe to be readily anchorable and to have graduated characteristics of flexibility and rigidity. Another object is to provide a means for centering the shoe within the drum.

Further objects will appear from the following detailed description of the apparatus embodying my invention, reference being had to the accompanying drawings wherein a preferred form is illustrated. The essential characteristics are summarized in the claims.

In the drawings, Fig. 1 is an elevation of the assembled shoes; Fig. 2 is a section taken along the lines 2—2 in Fig. 1; Fig. 3 is a section taken along the line 3—3 in Fig. 1; Fig. 4 is a section taken along the line 4—4 in Fig. 2, and Fig. 5 is a modification of the shoe entering the spring and lock shown in Fig. 2.

Referring particularly to Fig. 1, I show a brake drum D, a backing plate P, an auxiliary or servo shoe A, and a main shoe B. Referring also to Fig. 2, I provide an anchor pin 10 carried by a suitable bracket 11, which is in turn mounted on the backing plate P. Both of the shoes carry suitable lining L. The main shoe B is preferably formed as a split ring with both ends cut away to form arcuate bearing surfaces as at 14 and 15 to engage the anchor pin 10, (see also Fig. 4). The shoe B is partly formed in channel shaped cross section with inwardly extending radial side flanges 16 which preferably decrease in depth toward the mid portion of the shoes to points 17. Between the points 17, the main shoe comprises a flat curved band 18. The shoe formed in this manner has within itself characteristics of a "full-wrap" band so modified that either end of the shoe may "serve" the remainder of the shoe effectively without grabbing or freezing. Since the side flanges 16 decrease in depth from the ends of the shoes to the points 17, the channel portions have a progressively decreasing flexibility between the points 17 and the ends of the shoe. This permits the channel portion of the shoe to give slightly and conform itself to the curvature of the drum during engagement. The shoe is formed symmetrically with regard to the vertical axis of the brake, so that the braking characteristics are the same, regardless of the direction of the drum rotation.

Referring particularly to Figs. 1, 2 and 3, I show the end portions of the main shoe B to be reduced in cross section at the points 20. That is, the base or web of the channel and the side flanges are bent inwardly. These reduced portions extend from the points 20 to the anchor pin. The servo shoe A is channeled in cross section, and its side flanges 22 are spaced apart substantially the same distance as the main side flanges of the shoe B, so that the shoe A overlies and encloses the reduced ends of the shoe B. Passing through the reduced ends of the shoe B and mounted in the side flanges thereof, I provide pins 25 and 26 (see also Fig. 3) or other suitable abutments against which the ends of the shoe A abut, as 27. Suitable means, such as cotter pins, locate the pins 25. It will appear that in operation, with the aid of means presently to be described, when the shoe A is moved outwardly into engagement with the drum, it is carried in the direction of drum rotation circumferentially and forces one or the other of the pins 25 or 26 and the corresponding end of the shoe B to move outwardly and into contact with the drum and cause the shoe B to wrap upon itself to anchor at its opposite end. The shoe A surrounds and encloses the anchor pin 10, and since the shoe A has both radial and circumferential movement in either direction, a slotted opening 28 is cut in the side flanges 22 to give clearance around the anchor pin.

To raise the shoe A into engagement with the drum and to maintain it in such engagement while it moves circumferentially, I provide the following means; the end of the anchor pin 10 is slotted vertically as at 30, see Figs. 2 and 3, and a transverse pin 31 is mounted in the anchor to bridge the slot. Pivotally suspended from the pin 31 is a three-armed member 40 of which the central and outward arm 41 pivotally engages the pin 31. The arm 41 is slotted as at 42 to facilitate assembly. It will be noted that the ends of the shoe B are spaced away from the arm 41 as at points 43. The lowermost portion of the member 40 is formed to have a socket-like bearing surface 45 for receiving a ball-like member 46. The ball-like member 46 is secured to a cable 47 so that tension on the cable tends to swing the member 40 inwardly or in a counter-clockwise direction about the pin 31 as viewed in Fig. 2. The bottom of the member 41 is slotted, as at 48, so that the cable may be passed upwardly through the slot 48 in the process of assembly. A cotter pin may bridge the slot 48 as a precaution against the cable, dropping downwardly should the ball-like member 46 move out of the socket 45.

The member 40 comprises two other arms, 50 and 51 (see Fig. 4) which extend upwardly and straddle the anchor pin, but closely engage opposite sides of the anchor pin as at 52 to prevent circumferential movement of the members. The uppermost portion of the arms 50 and 51 carry rollers 53 and 54 respectively which may be pivotally mounted on suitable members, such as pins 55 and 56. These rollers 53 and 54 may have slightly rounded edges and are adapted to engage the inner side of the lining supporting portion of the shoe A, as at 60, (see Fig. 2). The web portion of the ends of the shoe B are cut away as at 61 (see Figs. 2, 3 and 4) to give the rollers access to the shoe A. The cable 47 passes through a suitable guide 70 held in the bracket 11, and may be further guided by means not shown, and is connected to the manually controlled operating mechanism. As mentioned above, tension on the cable rotates the member 40 in counter-clockwise direction about the pin 31, causes the rollers to be raised, and lifts the shoe A into engagement with the drum. As the shoe A moves circumferentially according to the direction of drum rotation, the rollers permit the shoe A to ride while maintaining radial pressure on the shoe.

Suitable retractor springs 80 and 81 join the ends of the shoe A with tangs in the shoe B which tend to draw the shoe A downwardly onto the ends of the shoe B, and also draw the ends of the shoe B against the anchor. In addition to these retractor springs, I provide another spring 82 for maintaining the lateral alignment of the body of the shoe with relation to the vertical axis of the brake, so that the shoe does not swing when idle, to contact with the drum. The spring 82 is hooked onto tangs 83 raised in the mid portion of the shoe, and passes slightly upwardly and is secured in a fixed position by a stud 84 which has a slot 85 for receiving the middle longitudinal strand of the spring. The stud 84 carries a nut 86 which is turned to draw the middle of the spring 82 against the backing plate and maintain it fixed in any desired position. The stud may have a slot 87 for receiving the end of a screwdriver to prevent its rotation, while the nut 86 is being turned. A suitable washer may lie between the nut and backing plate. Referring particularly to Fig. 5, I show a modification which amounts to using a sleeve 90 around the shank of the stud against which the spring 82 may be drawn, but which spaces the mid portion of the spring 82 at any desired distance away from the backing plate.

The foregoing describes a preferred form of my invention. Certain changes or modifications in the structure will appear to one skilled in the art. I do not care to be limited in the scope of my invention other than by the claims appended hereto.

I claim:

1. In a brake, a substantially annular shoe and a servo shoe overlying the ends of the first shoe both radially and axially.

2. In a brake, a substantially annular main shoe, an anchor engageable by an end of the main shoe, and a servo shoe having enlarged openings through which the anchor freely extends engageable with one end of the main shoe.

3. In a brake, a substantially annular main shoe, an anchor against which the ends of the main shoe abut, and a servo shoe engageable with at least one end of the main shoe and having enlarged openings through which the anchor freely extends.

4. In a brake, an anchor pin, friction means engaging said anchor pin, and a servo shoe overlying said anchor pin and engaging said friction means, said servo shoe having depending side flanges with enlarged aligned openings encompassing said anchor pin.

5. In a brake, a shoe formed in channel-shaped cross section, and friction means adapted to be served by said shoe and lying in part within the channel section of said shoe.

6. In a brake, an anchor pin, an unanchored shoe channeled in cross-section and having inwardly extending radial side flanges, said shoe being positioned to overlie said anchor pin, and an anchored shoe channeled in cross-section at least at one end and engaging said anchor and lying within the said unanchored shoe.

7. In a brake, a shoe anchored at at least one end and being channeled in cross-section at least adjacent its anchored end, the channel section immediately adjacent the anchor being smaller than the channel section more remote from it, and an unanchored shoe of channel section similar to the greater section of the first-named shoe, and overlying the reduced channel section adjacent the anchor pin.

8. In a brake, a shoe formed as a split ring and being channeled in section near its ends, an anchorage between the ends of said shoe, the channel sections adjacent the anchorage being smaller than the channel sections more remote from the anchorage, and an unanchored shoe overlying the reduced end portions of said first-named shoe and engageable with said shoe.

9. In a brake, a shoe formed as a split ring and being channeled in section near its ends, an anchorage between the ends of said shoe, the channel sections adjacent the anchorage being smaller than the channel sections more remote from the anchorage, and an unanchored shoe of channel section overlying the reduced end portions of said first-named shoe.

10. In a brake, a substantially annular shoe, an anchor disposed between the ends of said shoe, an unanchored shoe overlying both ends of said shoe, and means carried by said first-named shoe for engaging the ends of said unanchored shoe.

11. A brake comprising a shoe channeled in section at least at one end, a pin passing through the side flanges of said channeled section and a servo shoe having depending side flanges at least at one end engageable with said pin.

12. In a brake, a brake drum, an anchor pin positioned near the drum, a substantially annular brake shoe having its ends engaging said anchor pin, a second shoe disposed between said anchor pin and said drum and engageable with said first-named shoe at points spaced from its ends, and means associated with said anchor pin for moving said second shoe into engagement with said drum, whereby said second shoe is carried by said drum into engagement with one end of said first-named shoe, and carries said end away from said anchor.

13. In a brake, the combination of a brake drum, an anchor pin, a substantially annular brake shoe being partly channeled in cross section, and having that portion opposite its ends formed as a flat curved band, the extreme end portions of said shoe being reduced in cross section, a pair of pins carried by the side flanges of the said reduced portion and extending beyond the side flanges thereof, and an unanchored shoe having depending side flanges at least at its ends and overlying the reduced portions of said first-named shoe, said unanchored shoe being positioned between said pins, and being engageable with said pins.

14. A brake having a brake shoe formed as a substantially annular split ring with an anchorage disposed between its ends, said shoe having a relatively flexible mid-portion opposite the anchorage and being of progressively decreasing flexibility from its mid portion to said anchorage, and an unanchored shoe overlying the ends of said first-named shoe and extending in opposite directions beyond said anchorage and engageable with said first-named shoe at points spaced from its anchorage.

15. A brake, having a round pin, a brake shoe formed as substantially a split ring with the anchor pin disposed between its ends and pivotally supporting said ends, said shoe having a relatively flexible mid-portion opposite the point of anchorage and being of progressively decreasing flexibility from its mid-portion to points adjacent said anchor, an unanchored shoe overlying the ends of said first-named shoe, and engageable with said first-named shoe at points spaced from its anchorage, means for causing said unanchored shoe to move circumferentially to engage one end of said first-named shoe whilst the other end pivotally engages the anchor whereby the portion of the first named shoe adjacent the anchored end swings into engagement with the drum about the anchor pin as a pivot.

16. In a brake, a drum, an anchor pin, a brake shoe disposed between said pin and said drum, a member having a pivotal connection with said pin and having radially extending arms engaging the sides of said pin, and rollers carried by said arms engaging the inner face of said shoe.

17. A brake including a brake drum, a pin extending parallel to the axis of said drum, a brake shoe having a lining supporting portion disposed between said pin and said drum, a three-armed member having one arm pivotally connected to said pin and other arms extending radially on opposite sides of said pin, and rollers carried by said last-named arms engaging the lining supporting portion of said shoe.

18. In a brake, the combination of a brake drum, a pin extending parallel to the axis of said drum, a brake shoe lying between said pin and said drum, and means pivotally connected to said pin swingable in the plane determined by it and the axis of the drum and engaging the inner side of said shoe for moving said shoe radially into contact with said drum.

19. The combination of a brake drum, a brake shoe, a member mounted on a fixed pivot and adapted to swing in a plane of the axis of said drum to engage said shoe, and means for swinging said member and moving said shoe radially into engagement with said drum.

20. The combination of a brake drum, a backing plate, a pin carried by said backing plate and extending into said drum, friction means disposed between said pin and said drum, a member pivotally mounted in the end of said pin remote from said backing plate, and having a portion disposed between the pivot point and the backing plate for exerting a radial pressure against said friction means, said member also having a portion extending toward the axis of said drum, and a cable passing through said backing plate and engaging said last-named portion of said member for swinging it about its pivot point.

21. The combination of a brake drum, an anchor pin, a brake shoe disposed between said anchor pin and said drum, a second brake shoe engaging said anchor pin and having a portion extending parallel to said drum and lying nearer the axis of the drum than said first-named shoe, and means movable substantially radially beside said anchored pin for forcing said shoe into engagement with said drum, said last-named shoe being cut away to provide clearance for said means.

22. In a brake, a substantially annular brake shoe, an anchor pin disposed between the ends of said shoe and engaging the ends of said shoe, an unanchored shoe overlying the free ends of said shoe and said anchor pin, abutments carried by said anchored shoe at points spaced from its ends and adapted to engage the ends of the unanchored shoe, springs connected to the ends of said unanchored shoe and to the anchored shoe at points more remote from said anchorage than said abutments for drawing the ends of said anchored shoe against said anchorage and for drawing said unanchored shoe on to the end portions of said anchored shoe.

23. In a brake, the combination of a brake drum, a backing plate, an anchor pin, a substantially annular shoe having ends engaging said anchor pin, an unanchored shoe overlying the ends of said anchored shoe, retraction springs connecting the ends of said unanchored shoe to the body of said anchored shoe, and a centering spring disposed opposite said anchor pin, the ends of said spring engaging said anchored shoe at spaced points, and means for adjustably holding the mid-portion of said spring circumferentially relative to said backing plate.

24. In a brake, the combination of a brake drum, a backing plate, an anchor pin, a substantially annular brake shoe engaging said anchored pin between its ends, a tension spring positioned opposite said anchor pin, having its ends secured to spaced points on said shoe, and means for securing the mid-portion of said spring in fixed relation to said backing plate including a slotted stud extending through the backing plate through which a strand of said spring passes and a nut on said stud for drawing it through the plate and clamping the said strand of said spring against the plate.

25. A brake shoe, having a flat curved middle portion, an intermediate channel-shaped portion, and an end portion channeled in a section of a smaller dimension than said intermediate portion.

26. A brake shoe channeled in sections at least at one end and throughout a portion spaced from the end, the channel portion comprising side flanges with a web joining the flanges, the ends of the side flanges being cut away to form an arcuate anchor engaging surfaces, the side flanges being more closely spaced adjacent the anchor than in more remote portions, and the web portion lying in an arc of a smaller circle than the web portion of the said more remote portions.

27. A brake comprising a full floating substantially annular friction element anchorable between adjacent ends and unsupported except at said ends, a spring for centering the parts of said friction element remote from the anchorable ends, said spring comprising two coil parts with a middle straight strand, said spring being secured to said friction element at spaced points and having its middle part adjustably secured to a fixed part of the brake whereby the idle position of said element may be determinably positioned.

28. In a brake, the combination of a brake drum, a backing plate, an anchor carried by the backing plate, full floating brake shoe having its ends supported on the anchor in idle position and means for centering the mid portion of the shoe remote from the anchor including coil spring parts disposed generally in the zone of a chord of the circle of the drum with opposite ends engaging the shoe at spaced parts near the ends of such a cord, said coil spring parts being adjustably secured at the other ends to the backing plate adjacent the middle portion of said chord whereby the mid portion of the shoe is resiliently centered in idle position out of contact with the drum.

29. In a brake, the combination of a rotating drum, a fixed part carrying an anchor, a full floating substantially annular shoe having its ends supported on the anchor at least in idle position, and means for centering the mid-portion of the shoe to hold it out of contact with the drum in idle position, said means being positioned remote from the ends of the shoe and comprising oppositely acting springs each engaging the shoe at one end and being connected to the said fixed part at the other end, at least one of said springs being adjustably secured between the shoe and said fixed part whereby the idle position of the body of the shoe may be fixed relative to said drum.

30. In a brake, the combination with a brake drum, a backing plate, and a brake shoe associated therewith, of a tension member having its ends secured at spaced points on said shoe, and means for adjustably securing the mid-portion of said tension member in fixed relation to said backing plate including a stud extending through the backing plate and having an opening receiving said tension member, a sleeve on said stud, and means for drawing said stud through said sleeve for clamping said tension member against said sleeve and for clamping said sleeve against said backing plate.

31. A brake comprising in combination, a drum, a friction device within the drum having adjacent separable ends and which anchors at one of said ends when the drum is turning in one direction and at the other of said ends when the drum is turning in the other direction, and a servo shoe overlapping both of said ends a substantial distance and which is in direct thrust engagement with one or the other of said ends, according to the direction of rotation of the drum when the brake is applied.

32. A brake comprising, in combination, a drum, friction means within the drum having adjacent separable ends, and a servo shoe overlapping both of said ends a substantial distance and which is in direct thrust engagement therewith.

33. A brake comprising in combination, a drum, a friction device within the drum having adjacent separable ends and which anchors at one of said ends when the drum is turning in one direction and at the other of said ends when the drum is turning in the other direction, and a servo shoe, having spaced stiffening webs straddling said ends and arranged for direct thrust engagement with parts extending laterally from said ends.

34. A brake comprising, in combination, a drum, friction means within the drum having adjacent separable ends, and a servo shoe, having spaced stiffening webs straddling said ends and arranged for direct thrust engagement with parts extending laterally from said ends.

35. A brake comprising in combination, a drum, a friction device within the drum having adjacent separable ends and which anchors at one of said ends when the drum is turning in one direction and at the other of said ends when the drum is turning in the other direction, and a servo shoe, having spaced stiffening webs straddling said ends and arranged for direct thrust engagement with said ends.

36. A brake comprising, in combination, a drum, friction means within the drum having adjacent separable ends, and a servo shoe, having spaced stiffening webs straddling said ends and arranged for direct thrust engagement with said ends.

37. A brake comprising, in combination, a friction device shiftable to anchor adjacent either end, and a servo shoe acting on and overlapping said ends.

38. A brake comprising, in combination, a friction device shiftable to anchor adjacent either end, and a channel-section servo shoe arranged with the ends of the friction device extending into opposite ends of its channel.

In testimony whereof I hereunto affix my signature.

JOHN SNEED.